(12) United States Patent
Schneider et al.

(10) Patent No.: US 6,585,792 B2
(45) Date of Patent: Jul. 1, 2003

(54) AIR FILTERING SYSTEM HAVING EASILY REMOVABLE AND REPLACEABLE FILTER ELEMENT, AND METHODS

(75) Inventors: Kirk A. Schneider, Eden Prairie, MN (US); Jarren B. Mills, Apple Valley, MN (US); Daniel E. Adamek, Bloomington, MN (US); Terrance D. Feddersen, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/789,216

(22) Filed: Feb. 20, 2001

(65) Prior Publication Data

US 2002/0112458 A1 Aug. 22, 2002

(51) Int. Cl.[7] ............................ B01D 35/30; B01D 46/00
(52) U.S. Cl. ..................... 55/481; 55/385.2; 55/385.3; 55/486; 55/490; 55/527; 55/529; 55/DIG. 31
(58) Field of Search ................... 55/385.2, 385.3, 55/478, 480, 481, 482, 486, 490, 493, 502, 503, 504, 506, 529, DIG. 31, 527

(56) References Cited

U.S. PATENT DOCUMENTS

| | | | |
|---|---|---|---|
| 2,074,294 A | * | 3/1937 | Woodruff ................. 55/493 |
| 3,216,578 A | | 11/1965 | Wright et al. |
| 3,690,045 A | * | 9/1972 | Neumann ................. 55/481 |
| 4,135,900 A | | 1/1979 | Westlin et al. |
| 4,272,262 A | | 6/1981 | Britt et al. |
| 4,378,983 A | * | 4/1983 | Martin ..................... 55/481 |
| 4,472,184 A | | 9/1984 | Neumann et al. |
| 4,521,234 A | * | 6/1985 | Peebles et al. ............ 55/481 |
| 4,963,170 A | | 10/1990 | Weber et al. |
| 5,030,264 A | * | 7/1991 | Klotz et al. .............. 55/481 |
| 5,098,767 A | | 3/1992 | Linnersten |
| 5,125,941 A | * | 6/1992 | Ernst et al. ............... 55/481 |
| 5,641,331 A | * | 6/1997 | Diachuk ................... 55/481 |
| 5,740,774 A | * | 4/1998 | Kennedy .................. 55/481 |
| 6,007,169 A | * | 12/1999 | Li et al. ................. 55/385.6 |
| 6,267,793 B1 | * | 7/2001 | Gomez et al. ............ 55/480 |
| 6,319,307 B1 | * | 11/2001 | Shanks et al. ............ 55/493 |

FOREIGN PATENT DOCUMENTS

| | | |
|---|---|---|
| DE | 8700521 | 5/1987 |
| DE | 3916544 | 11/1990 |
| FR | 2034160 | 12/1970 |

* cited by examiner

Primary Examiner—Duane Smith
Assistant Examiner—Jason M. Greene
(74) Attorney, Agent, or Firm—Merchant & Gould P.C.

(57) ABSTRACT

An air filter assembly for removing particulate contaminants, chemical contaminants, biological contaminants, or any combination thereof, from airplane cabin air. The filter assembly is lightweight and compact in size. Minimal clearance is needed in order to remove and replace the filter element.

21 Claims, 7 Drawing Sheets

AIR FILTERING SYSTEM HAVING EASILY REMOVABLE AND REPLACEABLE FILTER ELEMENT, AND METHODS

FIELD OF THE DISCLOSURE

The present invention is related to air filtering systems having a filter element removable and replaceable from the filter housing. In particular, the invention is directed to air filtering systems in which access space into the assembly is limited.

BACKGROUND OF THE DISCLOSURE

Air travel is one of the most common modes of transportation in today's society. Thousands of planes carry travelers across the country and around the world on both business and personal trips. For many of these trips, the flight is at least two hours long, and sometimes, the flight is eight hours long or more.

When airborne, the airplane is sealed and pressurized, with partial exchange of air from the atmosphere with the plane interior. What this means is that only some of the ventilation air for the passenger cabins is brought into the plane from the outside. Typically, about 50%, depending on the plane model, of air supplied to the cabin is from the outside atmosphere. This limited amount of fresh air is mixed with air from the cabin that is continuously recycled. Understandably, the cabin air can quickly become contaminated. Some people blame the air for carrying infectious viruses and other contaminants that produce illness. Even if no infectious contaminants are present, the air, nevertheless, often has a quality that is undesirable to many passengers.

Air filtration systems have been designed to remove contaminants from the recirculated air. However, these filtration systems are constrained by the severe weight and size requirements determined by the airplane manufacturer. Given these small weight and size limits, the air filtration systems have been greatly undersized for the amount of cabin air needing to be filtered. Further, the often inconvenient placement of the filtration system in the aircraft hinders access to the filter for replacement.

What is desired is an improved air filtration system for cabin air of airplanes.

SUMMARY OF THE DISCLOSURE

The present invention is directed to an air filter system that can be installed in applications that have a minimal amount of space for retaining a filter housing and a limited amount of space for removal and replacement of the filter element from that housing. In particular, the air filter system of the present invention is adapted for use in airplanes for filtering cabin air. The light weight construction of the filter system, which includes a filter housing and a filter element, is beneficial for airplanes where weight can be critical. Additionally, the mounting system for retaining the filter element in the housing allows removing and replacing the filter element in areas with low or small clearance areas.

In one aspect of this invention, an air filtration system is provided. The air filtration system includes a housing and an air filter within the housing.

In particular, the invention is directed to an air filtration system that comprises a housing having an inlet and an outlet, the inlet receiving dirty air to an interior of the filter assembly, and the outlet receiving clean air from the interior. The housing further comprises a first rail fixedly attached to the interior of the housing and a second rail movably attached to the first rail. A filter element is positioned within the housing, the filter element comprising filtration media supported by a frame. At least one peg extends from the frame of the filter element. The system further includes a locking system for retaining the filter element within the housing. This locking system comprises the first rail fixedly attached to the interior of the housing, the first rail having a first retaining feature, such as a slot, therein. The locking system further comprises the second rail movably attached to the first rail, the second rail having a second retaining feature, such as a slot, therein. When the second rail is in an extended position, the first retaining feature is aligned with the second retaining feature, and, when the second rail is in a retracted position, the first retaining feature is offset from the second retaining feature. The peg on the filter frame is constructed and arranged to fit within the first retaining feature and the second retaining feature.

The housing has a weight no greater than about 10 kg, preferably no greater than about 8 kg, and the filter element has a weight no greater than about 5 kg, preferably no greater than about 3 kg.

In another embodiment, the invention provides an air filter system comprising a housing having an inlet, an outlet, and an interior, the housing configured to mount a filter element within the interior between the inlet and the outlet, and a filter element loading and locking mechanism. The loading and looking mechanism comprises a first guide member on the filter element, and a second guide member mounted to the housing and configured to cooperatively engage the first guide member such that the filter element can be slideably inserted into the housing by contact primarily only between the first and the second guide members. Also part of the loading and locking mechanism is a positioning mechanism in the housing for cooperatively engaging the first guide member as the filter element is being inserted into the housing for operatively positioning the filter element within the housing, and a locking mechanism for retainably locking the filter element in the operative position.

A filter element is also provided. The filter element includes a frame to support filtration media, the frame having a front side, a back side, a first side wall and a second side wall opposite the first side wall. A first peg extends from the first side wall and a second peg extends from the second side wall. A third peg can extend from the first side wall and a fourth peg can extend from the second side wall.

One specific filter element has the pegs extending from the first side wall at least 0.5 cm, the pegs on the same side wall having a distance of 28.302 cm to 28.378 cm therebetween.

Other variations of filter elements and air filtration systems in accordance with the present invention will be apparent with respect to the following Figures and Description.

BRIEF DESCRIPTION OF THE DRAWINGS

In describing the various aspects of the preferred embodiment, reference is made to the Figures, wherein.

DETAILED DESCRIPTION OF THE PREFERRED EMBODIMENT

Figure 1:
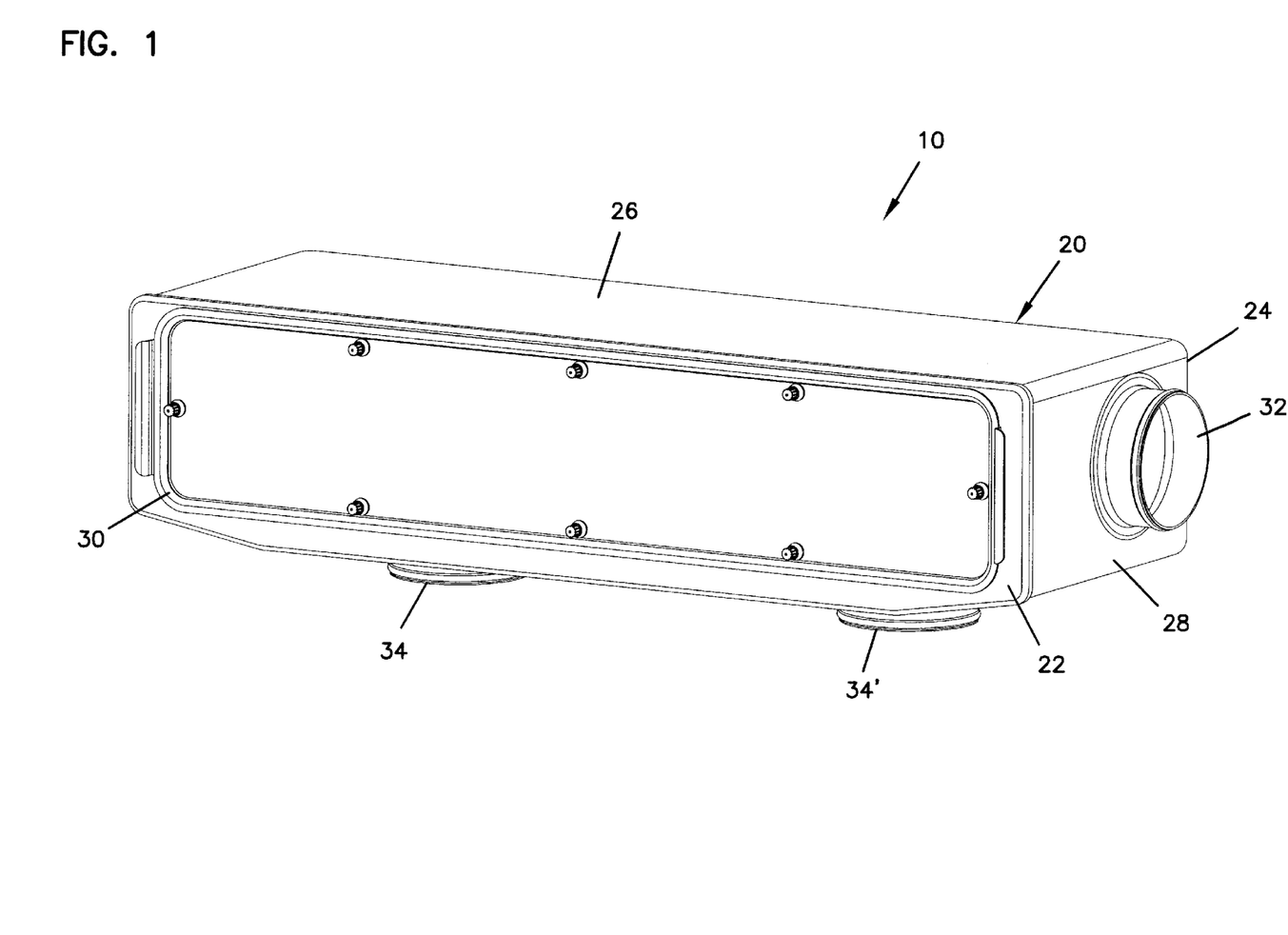
FIG. 1 is a perspective view of the air filter system of the present invention.

Referring to FIG. 1, an air filter system 10 of the present invention used to remove contaminants from air, such as in airplane cabins, is shown. Such filter systems 10 are typically located either above the passenger's heads in an airline cabin, either below or along side overhead storage compartments of the airplane, or in the luggage compartment below the cabin space. Such filter locations impose severe size constrictions on the filter system and provide unique problems for replacing the filter elements of such filter systems.

Although the following discussion will be in the context of using air filter system 10 and its various components in the passenger cabin of airplanes, it is understood that air filter system 10 can be used in any location desirous of an air filtering system that occupies a minimal amount of space.

Figure 5:
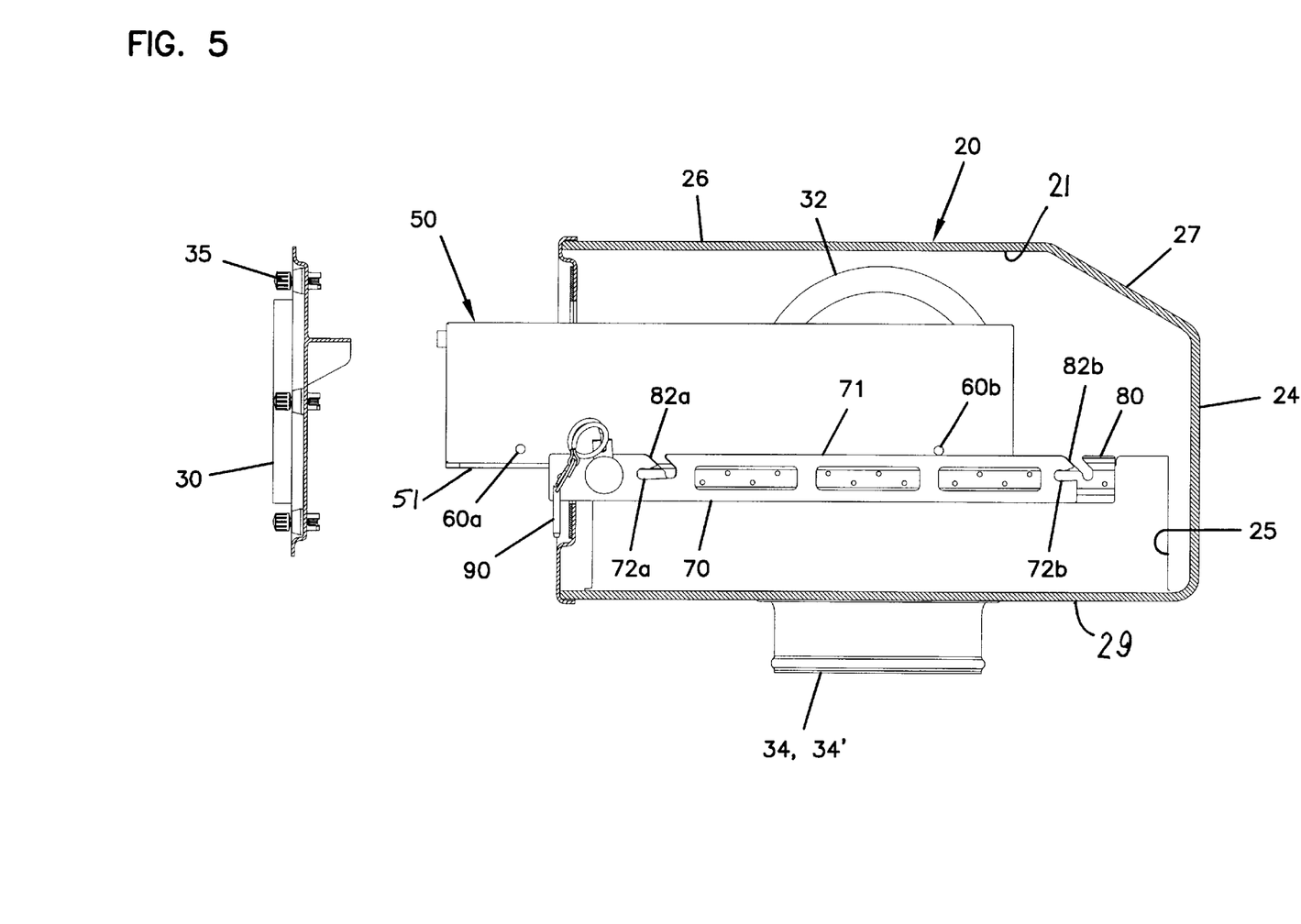
FIG. 5 is a cross-sectional view of the air filter system of FIG. 2, generally showing the filter element in a first, partially installed, position.

As depicted in FIG. 1, air filter system 10 has a filter housing 20. Filter housing 20 is defined by a front wall 22, back wall 24, top wall 26, a first side walls 28 and an opposite side wall (not seen), and a bottom wall 29 (FIG. 5) and has an interior volume 21 (FIG. 5) that is accessible by removing a front access panel 30. Front access panel 30 close front wall 22. In the preferred embodiment, housing 20 is generally rectangular in shape, although filter housing 20 can include a sloped corner wall 27, as shown in FIG. 5, which extends from and connects top wall 26 to back wall 24. Dirty air enters housing 20 via an inlet 32 located within side wall 28, and clear air exits housing 20 via outlets 34, 34'. Although not seen in the Figures, each of opposite side walls 28 has an inlet 32 therein. Thus, housing 20 has two inlets, positioned at opposite ends of housing 20.

Filter housing 20 is preferably made from a light weight material. Examples of usable materials include aluminum, plastic (such as polyethylene, polypropylene, polycarbonate), fiberglass, and other composite materials such as carbon/epoxy. In a preferred embodiment, filter housing 20 comprises a molded composite laminate having a phenolic honeycomb core with woven graphite epoxy prepreg skins on either side of the honeycomb core. An example of a usable composite core is an aramid/phenolic honeycomb construction commercially available from Hexcel Corp. of Pleasanton, Calif. under the trade designation "Hexcel Composites HRH-10". An example of a woven graphite epoxy prepreg skin is commercially available from J. D. Lincoln Inc. of Costa Mesa, Calif. under the trade designation "Fiberply" or "L901". It may be desired to use more than one material for filter housing 20; for example, two different types of composite materials can be used. A second example of a composite material is a low-density vinyl ester-based ESC (engineered structural composite) commercially available from Quantum Composites, Inc. of Midland, Mich. under the trade designation "QC-8744". In one embodiment, filter housing 20, specifically back wall 24, top wall 26, side walls 28, and bottom wall 29 are made from 0.1875 inch (4.8 mm) thick "Hexcel HRH-10" honeycomb construction with two layers of "Fiberply" skin on each side. Front wall 22, access panel 30, inlet 32 and outlets 34, 34'are made from compression molded layers of "QC-8744" at a thickness of 0.090 inch (2.29 mm).

The shape of filter housing 20, when typically formed as a rectangle, is generally no greater than about 160 cm by 70 cm by 40 cm. In some designs, filter housing 20 is no greater than about 158 cm by 66 cm by 38 cm. It is preferred that the size of filter housing 20 be no greater than about 105 cm by 44 cm by 25 cm. For housings 20 having a shape other than rectangular, a general design consideration is that filter housing 20 occupy a volume of no greater than about 150,000 $cm^3$, and preferably no greater than about 115,500 $cm^3$.

The weight of filter housing 20 is generally no greater than about 10 kg. Preferably, filter housing 20 weighs no more than about 9 kg, and in a preferred embodiment, weighs no more than about 8 kg. In filter assembly 10 of the preferred embodiment, air from the airplane cabin enters air filter system 10 via one or more inlets 32, and exits system 10 via one or more outlets 34, 34'. Prior to entering filter system 10 via inlet 32, the air is dirty, having various physical (e.g., particulate), chemical, and biological contaminants. Exiting filter system 10 via outlets 34, 34' is clean air. Air filter system 10 removes at least some of the contaminants, either particulate contaminants, chemical contaminants, or both, from the dirty air to produce the clean air, as explained below.

Figure 2:
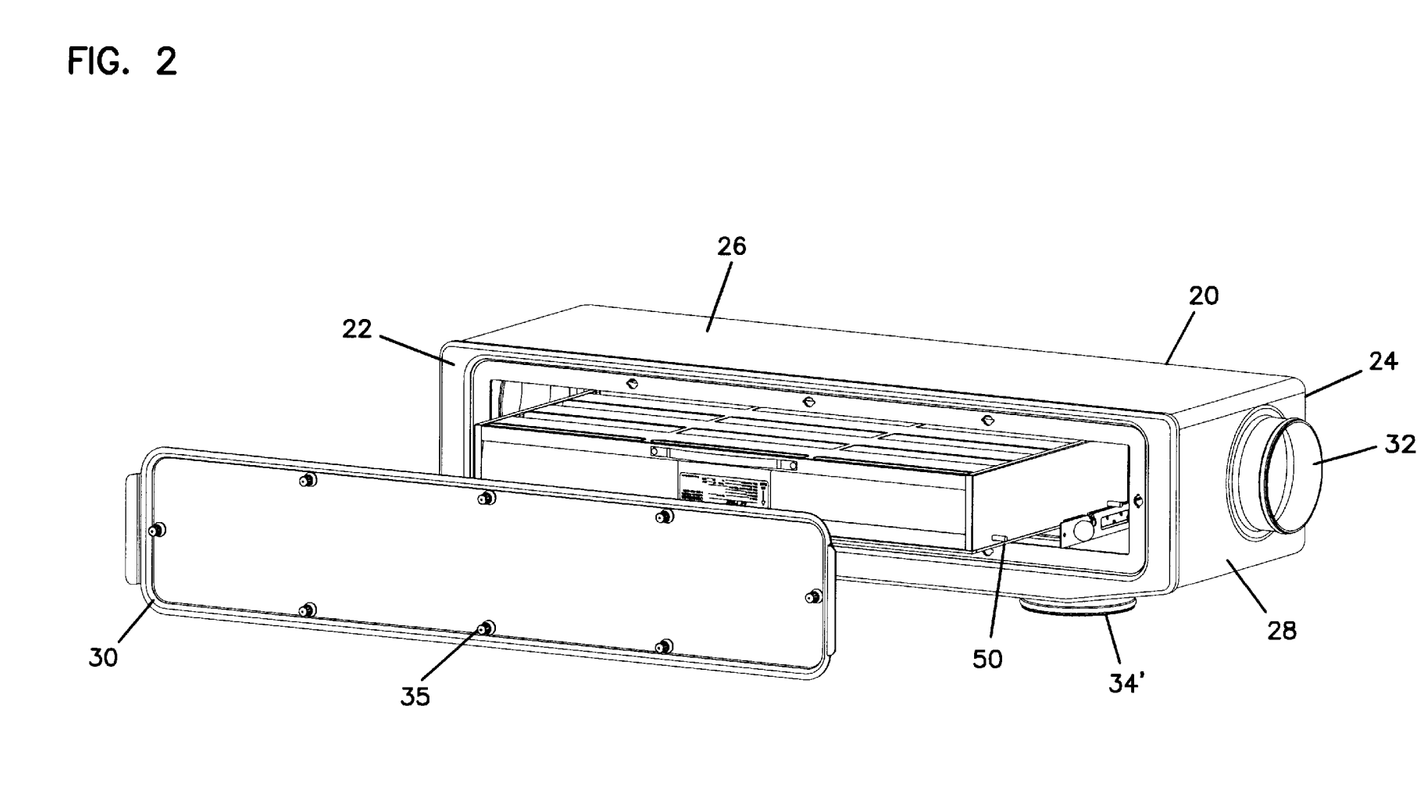
FIG. 2 is a perspective view of the air filter system of FIG. 1 illustrating the access panel removed and the filter element partially exposed.

Located within filter housing 20 is a filter element 50, which is shown partially withdrawn from filter housing 20 in FIG. 2. In order to withdraw filter element 50 from filter housing 20 as shown in FIG. 2, front access panel 30 is removed from front wall 22. In the preferred embodiment, front access panel 30 is retained on front wall 22 of filter housing 20 by quarter turn fasteners 35, but any fastening device or system, such as clips, clamps, screws, or hook-and-loop attachment, can be used. Preferably, the attachment system for front access panel 30 is such that it does not attach to front wall 22 unless filter element 50 is fully engaged and locked within filter housing 20, as will be described below.

Figure 3:
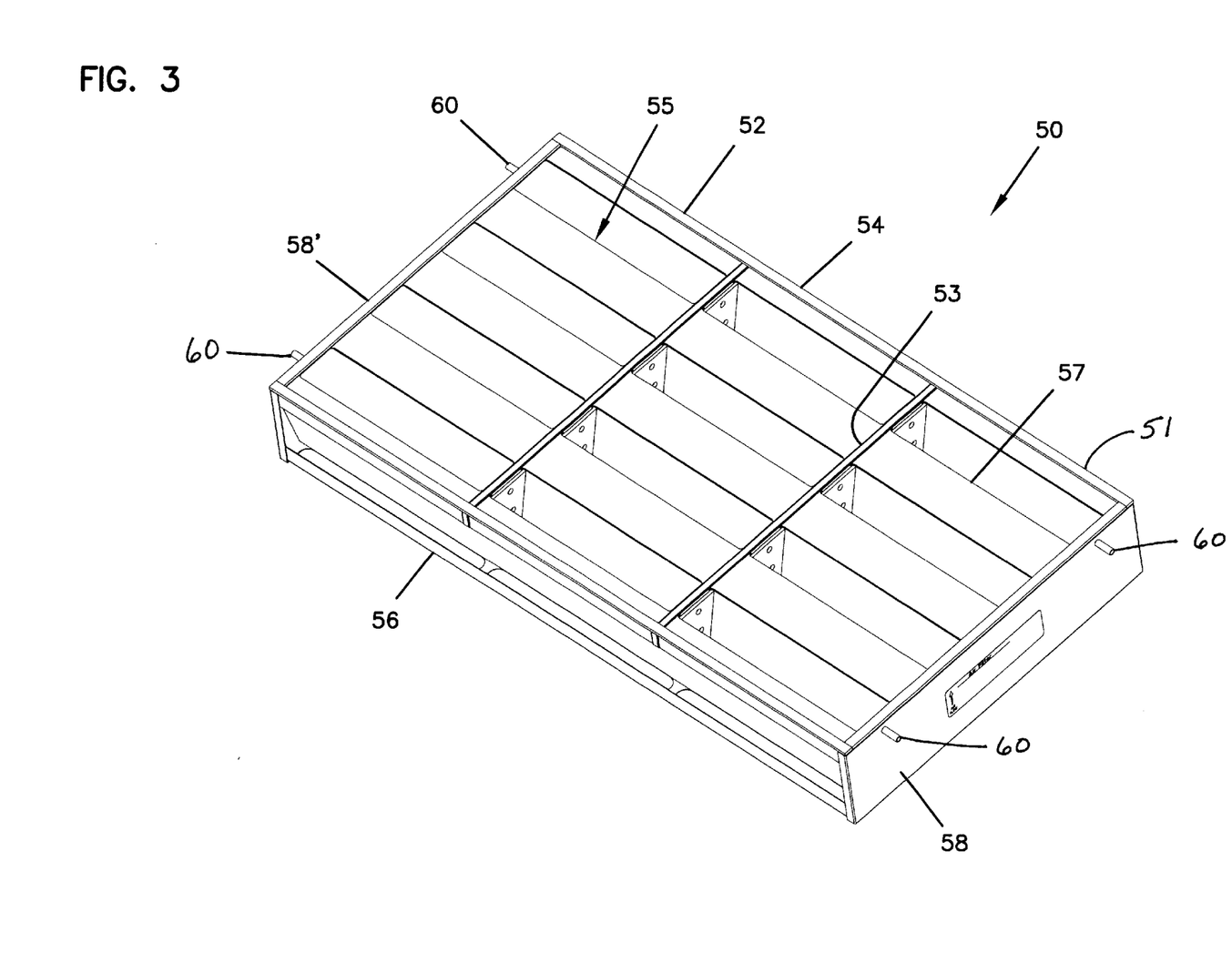
FIG. 3 is a perspective view of the filter element shown in FIG. 2.
Figure 4:
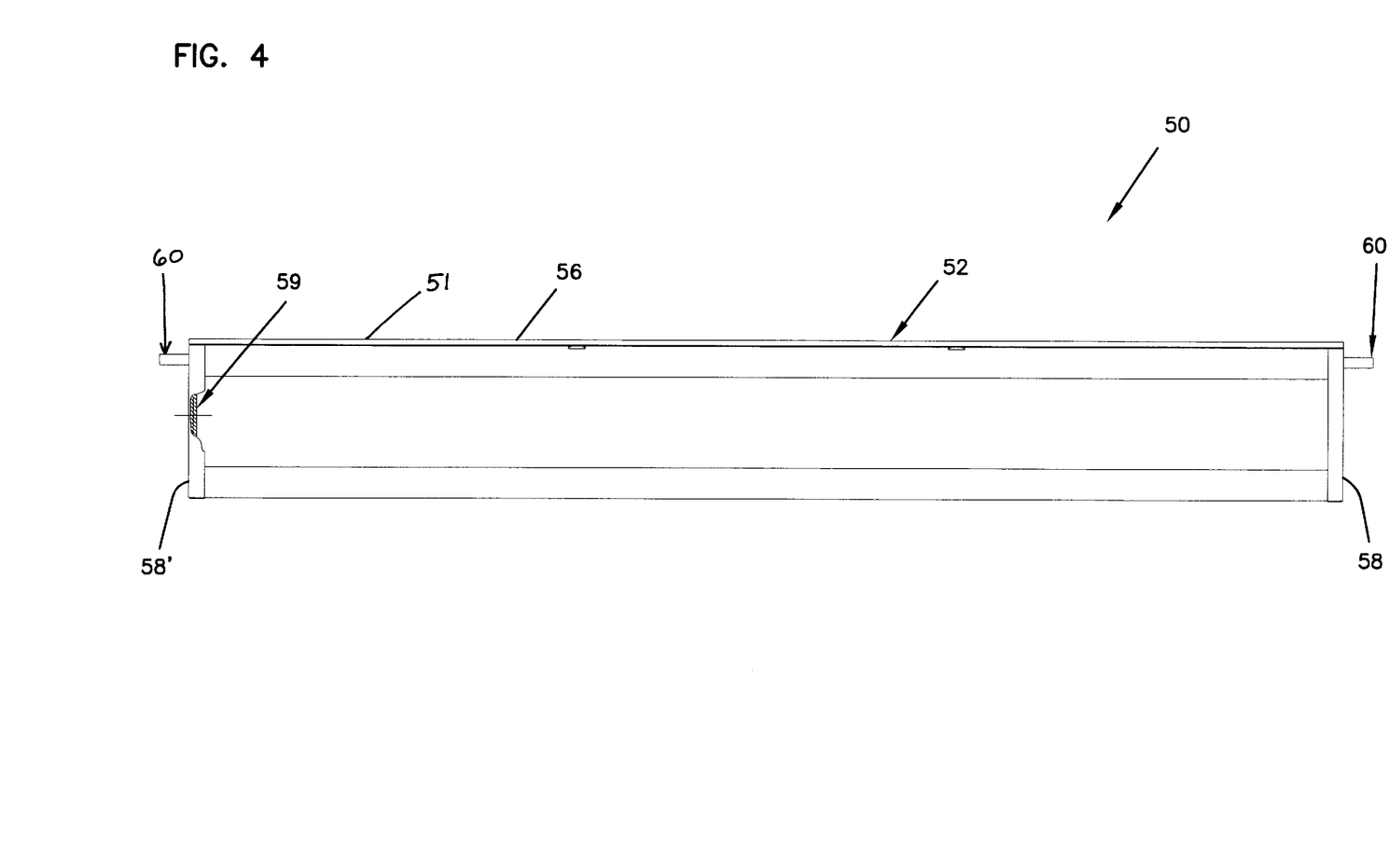
FIG. 4 is a front view of the filter element of FIG. 3.

Filter element 50 is shown removed from filter housing 20 in FIGS. 3 and 4. Filter element 50 has an outer peripheral frame 52 defined by back edge 54, front edge 56, and opposite side edges 58, 58'. In this embodiment of filter 50, extending from back edge 54 to front edge 56 are cross members 53, and extending from side edge 58 to side edge 58' are longitudinal members 57. Cross members 53 and longitudinal members 57 provide support and stability to filtration media 55. It is not necessary that cross members 53 and longitudinal members 57 are constructed as shown in FIG. 3; rather, cross members 53 and longitudinal members 57 could be replaced with any type of structural support element that would support filtration media 55, as will be explained below.

Frame 52, including cross members 53 and longitudinal members 57, can be made from any material having sufficient integrity to retain and support filtration media 55. Preferably, a light-weight material is used for frame 52. Examples of usable materials include aluminum, titanium, plastic, fiberglass or other composites, and the like.

A gasket 51 is positioned along the outer periphery of frame 52. Use of gasket 51 will be explained in detail below.

Filter element 50 is shown as being, generally, a panel filter; that is, filter element 50 is generally planar, having a fairly thin thickness; filter element 50 is a three-dimensional rectangle. The size of filter element 50, as a three-dimensional rectangle, is generally no greater than about 60 cm by 15 cm by 110 cm. In a preferred embodiment, the size of filter element 50 is no greater than about 39 cm by 10 cm by 71 cm. It is not necessary that the filter element 50 is a three-dimensional rectangle; rather, filter element 50 can have any two-dimensional shape, including any polygon such as a triangle, pentagon, hexagon, octagon, and the like. Further, filter element 50 can be circular, oval, or the like. Likewise, it is not necessary that filter element 50 is generally planar with a thin thickness. Rather, filter element 50 can be a cylinder, column, cube, or any such shape having pronounced three-dimensions.

A general property is that filter element 50 occupy a volume of no greater than about 100,000 $cm^3$ (1 $m^3$), preferably no greater than about 75,000 $cm^3$. In one embodiment, filter element 50 occupies about 28,000 $cm^3$, specifically, 27,690 $cm^3$. It is preferred that the use of the volume within filter housing 20 is maximized; that is, it is desired that filter element 50 be as large as practically possible while allowing for adequate circulation of air around element 50.

The weight of filter element 50, including frame 52 and filtration media 55, when filter element 50 is clean, is generally no greater than about 5 kg. Preferably, filter element 50 weighs no more than about 3 kg, and in a preferred embodiment, weighs no more than about 2.5 kg. This provides an overall air filter system 10 being no more than 15 kg, preferably no more than 12 kg, and more preferably no more than 10.5 kg.

Filtration media 55 removes contaminants from an air stream passing through filter system 10 and filter element 50. The specific type and extent of contaminants removed from the air depends on the contaminants present in the air and on the type of filtration media 55 used. Various types of filtration media 55 can be used, as will be discussed below.

Positioned along and extending from each of side edges 58, 58' of filter element 50 are a plurality of retention pegs 60. In the embodiment shown, a pair of such pegs 60 are longitudinally spaced and positioned along the opposed side edges 58, 58' of the filter. Retention pegs 60 support and retain filter element 50 within filter housing 20 and act as a guide member for filter element 50. Operation of pegs 60 will be described in greater detail below.

Pegs 60 can have any cross sectional area, such as circular (as shown in the Figures), or square, triangular, hexagonal, pentagonal, oval, and other shapes. Cylindrical pegs 60 are preferred, mainly because of cost and performance. Pegs 60 extend from side edge 58 at least 0.5 cm, preferably at least 1 cm, and generally no more than 2 cm. In some designs, pegs 60 extend from side edge at least 1.2 cm and no greater than about 1.7 cm. The distance between pegs, such as pegs 60a and 60b, is generally in the range of 10 to 12 inches (25.4 to 30.5 cm), preferably 10.75 to 11.5 inches (27.3 to 29.2 cm). In a preferred embodiment, the distance is about 11 inches (27.9 cm), and specifically, about 11.157 inches (28.3 cm).

Filter element 50 can be designed to remove physical (e.g., particulate) contaminants, chemical contaminants, biological contaminants, or any combination thereof. Filter element 50 will generally be designed to remove particulate contaminants, which in most instances, also includes biological contaminants. The particular types of filter media 55 of filter element 50 are selected for their capability of removing the desired contaminants. In some embodiments, a separate portion of the filter element can be used for the removal of each contaminant, or a single filter element can be used for the removal of multiple contaminants.

For removing particulate contaminants, a filter media, such as a fibrous mat or web, including paper or glass, may be used to remove particles such as dust, dirt, pollen, and the like, and microscopic particulate such as aerosols produced by combustion, bacteria, viruses, and the like.

Although shown in the Figures as a single continuous filter element 50, filter element 50 can include multiple particulate filtration portions; for example, filter element 50 can include a pre-filter for removal of large particulates, such as 0.01 mm in size. In some embodiments, a pre-filter can remove particles as small as about 0.3 micrometers, or less.

Filter element 50 can include a portion of filter media 55 designed to remove chemical contaminants from the atmosphere by either adsorption or absorption. As used herein, the terms "adsorb", "adsorption", "adsorbent" and the like, are intended to also include the mechanisms of absorption and adsorption. Filter media 55 can include a physisorbent or chemisorbent material, such as, for example, desiccants (i.e., materials that adsorb or absorb water or water vapor) or materials that adsorb or absorb volatile organic compounds and/or acid gases and/or basic gases. Suitable adsorbent materials include, for example, activated carbon, activated carbon fibers, impregnated carbon, activated alumina, molecular sieves, ion-exchange resins, ion-exchange fibers, silica gel, alumina, and silica. The adsorbent materials are typically particulates or granulated material and can be present as granules, beads, fibers, fine powders, nanostructures, nanotubes, aerogels, or can be present as a coating on a base material such as a ceramic bead, monolithic structures, paper media, or metallic surface.

It is understood that any number of media types having various particulate or chemical removal efficiencies can be combined to create filter media 55 of filter element 50. These various medias can be provided as individual filter portions or can be combined to form a single media. The desired particulate removal system will depend on the type of contaminants present in the air and the desired cleanliness level of the resulting filtered air. Filter media 55 can be held in frame 52 by any appropriate technique or material such as a potting media 59, shown at side wall 58' of FIG. 4.

Figure 6:
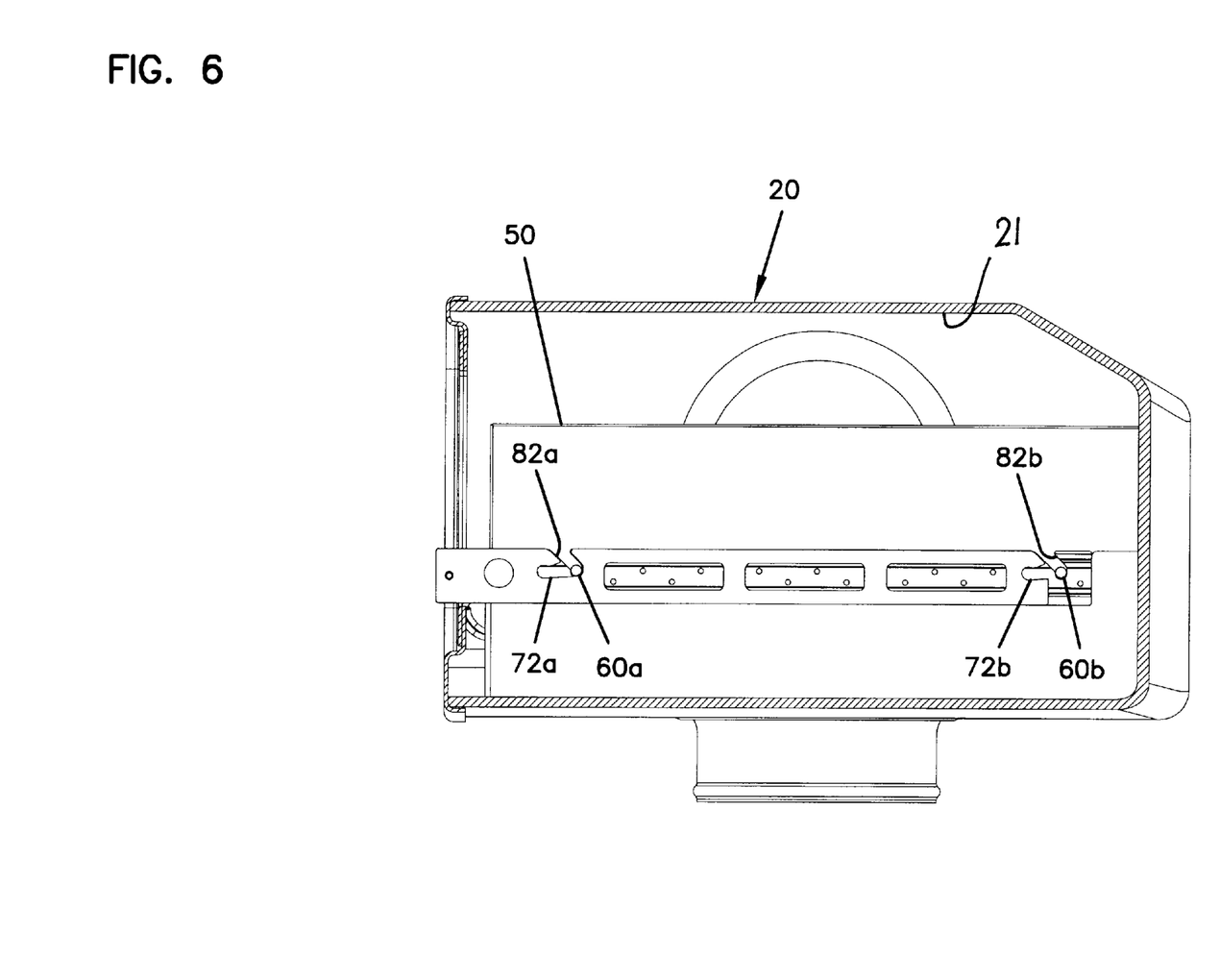
FIG. 6 is a cross-sectional view of the air filter system of FIG. 2, illustrating a different plane than the cross-sectional view of FIG. 5, showing the filter element in a second, fully engaged, position.
Figure 7:
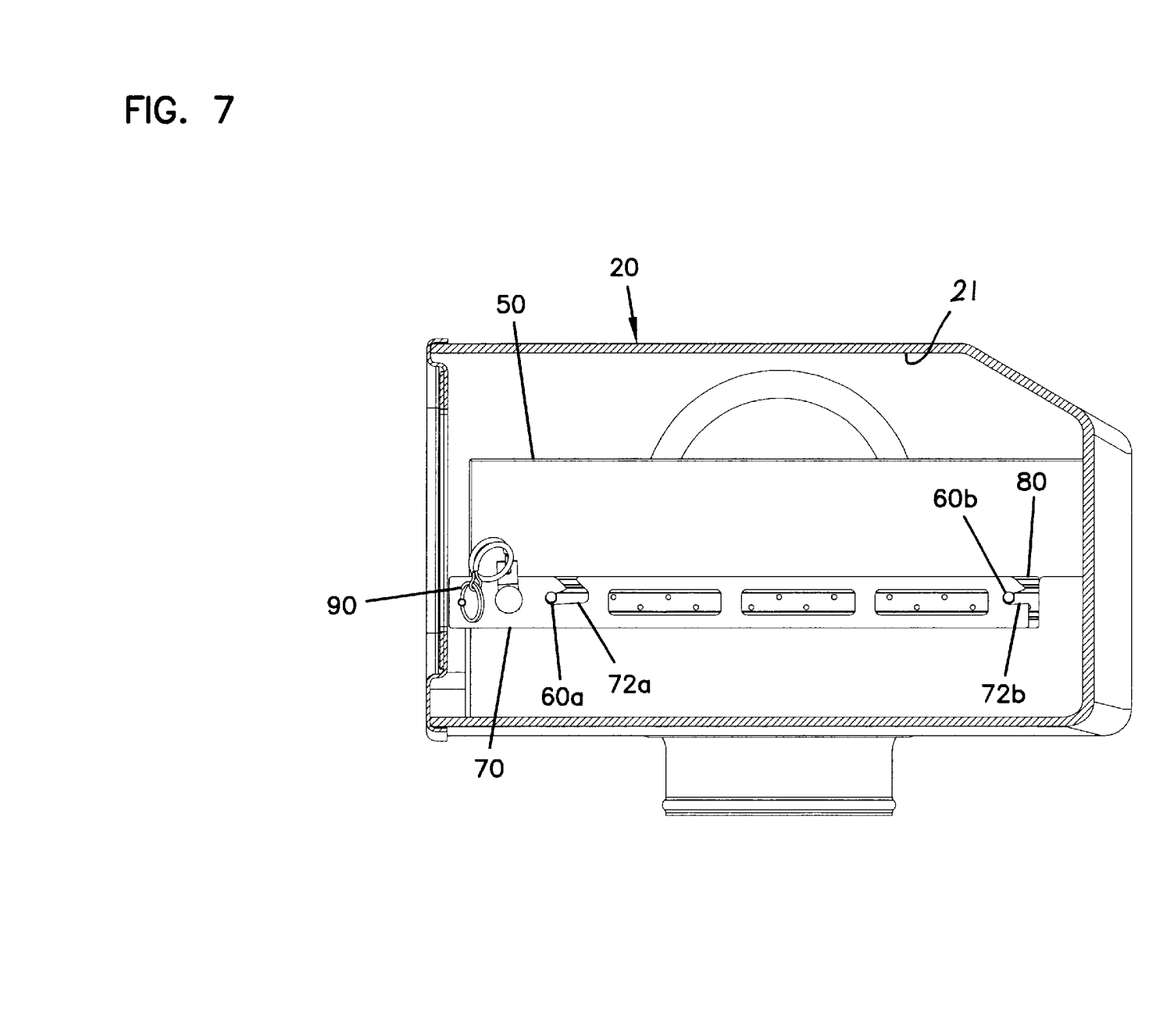
FIG. 7 is a cross-sectional view of the air filter system, similar to the cross-sectional view of FIG. 6, showing the filter element in a third, locked, position.

Attention is now directed to FIGS. 5, 6 and 7, which illustrate the interior 21 of filter housing 20 and the placing, positioning, and locking of filter element 50 into filter housing 20. Positioned within filter housing 20 is an interior plenum 25 (FIG. 5). In a preferred embodiment, interior plenum 25 is a four-sided box, which is attached to the interior of the bottom wall 29 (FIG. 5). Bottom wall 29, with the four-sided plenum 25 and filter element 50, form a six-sided box. Plenum 25 is operatively connected to outlet ports 34, 34' and is configured such that all air entering inlet 32 must pass through filter element 50 prior to exiting via outlets 34, 34'. Plenum 25 should be sized to provide sufficient distribution of air from inlet 32 across filter element 50.

Filter element 50 is positioned on top of interior plenum 25 by being removably positioned on a locking rail system, which comprises a movable rail 70 that is supported by a fixed rail 80. Fixed rail 80 is attached to plenum 25, and movable rail 70, which is positioned between fixed rail 80 and housing 20, is longitudinally movable, preferably slidable, in respect to fixed rail 80 and interior 21 of housing 20 when front access panel 30 is removed. In any alternate embodiment, fixed rail 80 is attached to the interior of plenum 25, and moveable rail 70 is movable into and out of plenum 25 and the interior of filter housing 20 when front access panel 30 is removed.

Movable rail 70 includes locking slots 72, each slot 72 retaining one peg 60 therein. In FIGS. 5, 6 and 7, two locking slots 72a, 72b are shown which retain pegs 60a, 60b, respectively. Fixed rail 80 also includes support slots 82, which accept peg 60 therein. In FIGS. 5, 6 and 7, two support slots 82a, 82b are shown which retain pegs 60a, 60b, respectively. Each of locking slots 72a, 72b and support slots 82a, 82b have a distance therebetween that correlates to the distance between pegs 60a, 60b. Slots 72, 82 should be shaped and sized to minimize movement of filter element 50 when pegs 60 are locked within slots 72, 82.

Slot 72a is generally "L" shaped, having a first generally vertical segment that extends downward from the upper edge of rail 70 to a second longitudinal segment, which extends essentially parallel to the outer edge of rail 70. It is not necessary that slot 72a is "L" shaped; rather, slot 72a preferably has two segments, the first segment extending from the edge of rail 70 and the second segment positioned at an angle other than 0 or 180 degrees to the first segment. Both locking slots 72a, 72b and 82a, 82b are designed to have pegs 60 of filter element 50 drop vertically into position, minimizing, and preferably eliminating, drag on the gasket used to create a seal between filter element 50 and interior plenum 25 during installation of filter element 50. Additionally, locking slots 72a, 72b are designed to minimize the amount of force needed to lock and seal filter element 50 into interior plenum 25 and its sealing surfaces.

It is possible that slot 72a could include a third segment. Slot 72b could be shaped as is slot 72a, however in the embodiment shown, slot 72b is positioned at an end of rail 70 and does not include a first segment extending from the top edge of rail 70. Rather, slot 72b only has a single segment comparable to the second segment of slot 72b extending essentially parallel to the outer edge of rail 70.

It is not necessary that the entire length of any of locking slots 72a, 72b or support slots 82a, 82b be the same width. In some instances it may be desired to have a recess shaped and sized like peg 60a, 60b, to retainably accept and hold peg 60a, 60b therein.

Pegs 60 on filter element 50, and slidable rail 70 and fixed rail 80 combine to form an attachment or locking system that provides for easy removal and replacement of filter element 50 from filter housing 20. This system securely locks and seals filter element 50 within filter housing 20 with a minimal amount of latches, covers, screws, and other removable items that can get misplaced or lost during removal or replacement of filter element 50. Additionally, a minimal amount of space is need on either side of filter element 50 to position and handle filter element 50. Additionally, filter element 50 is supported so that sealing gasket 51 on the bottom of filter element 50 does not drag across the sealing surface of plenum 25; this could potentially damage gasket 51 possibly allowing leakage of air around filter element 50 and resulting in filtering inefficiencies of filter system 10.

FIGS. 5, 6 and 7 illustrate stepwise loading and securing of filter element 50 into filter housing 20 using pegs 60, slidable rail 70, and fixed rail 80. Although both cross-sections are taken between side wall 28 of housing 20 and rails 70, 80, the cross-section of FIG. 5 is taken closer the center of back wall 24, whereas the cross-section of FIGS. 6 and 7 is taken closer to side wall 28. This results in plenum 25 not being visible in FIGS. 6 and 7.

In FIG. 5, front access panel 30 is shown removed from front wall 22 of filter housing 20. Quarter turn fasteners 35 were used to remove front access panel 30 on front wall 22 and will secure front access panel 30 when replaced onto front wall 22. Filter element 50 is shown partially extended from filter housing 20 and being placed into filter housing 20. Movable rail 70 is in a second, extended position, partially extended out from the interior of filter housing 20; typically, movable rail 70 extends no more than 5 cm out from its non-extended position, preferably no more than about 2.5 cm. With pegs 60a, 60b resting and sliding on the upper edge 71 of extended rail 70, filter element 50 is pushed into filter housing 20 (to the right, as illustrated in FIG. 5) until peg 60a drops into and seats within slot 72a and peg 60b drops behind the end of rail 70 and into slot 82b. Sliding filter element 50 on edge 71 of rail 70 allows sealing gasket 51 to be raised above the sealing surface of plenum 25 as filter element 50 is loaded into housing 20, thus minimizing the damage to sealing gasket 51.

In FIG. 6, filter element 50 has been operatively positioned to its rearmost position within filter housing 20, although a portion of rail 70 still extends out from the interior of filter housing 20. As seen in FIG. 6, the first segment of locking slot 72a overlaps support slot 82a. The end of support slot 82a is level with the end of the first segment and beginning of the second segment of slot 72a. Support slot 82b aligns and is level with slot 72b. Peg 60a is positioned and retained in each of slot 72a and support slot 82a, and peg 60b is retained within support slot 82b. Slidable rail 70 is still in the first, extended position, as shown in FIG. 6.

As slidable rail 70 is retractably moved into housing 20 toward a retracted position, that is, rail 70 is moved to the right as illustrated in FIG. 6, pegs 60a, 60b respectively, are slidably retained within slot 72b and the second locking segment of slot 72a, respectively.

In FIG. 7, pegs 60a, 60b are illustrated as being fully retained within each of locking slots 72a, 72b and locking slots 82a, 82b. Because no portion of slot 72a, 72b overlaps with slot 82a, 82b, other than the portion occupied by peg 60a, 60b, peg 60a, 60b cannot be removed from either slot 72a, 72b or slot 82a, 82b until movable rail 70 is moved so that the various locking slots align. A retaining member 90 is used to lock movable rail 70 in place. Retaining member 90 can be a cotter pin, clip, pin, screw, nail, or the like.

A preferred filter system 10, including filter housing 20 and filter element 50 has the following dimensions. For filter housing 20, the overall length from one side wall 28 to the opposite side wall 28' is 105 cm; if the distances the inlet 32 extend from side walls 28, 28' are included, the overall length of filter housing 20 is 114.24 cm. The depth of filter housing 20, from front wall 22 to back wall 24, is 43.81 cm. The height of filter housing 20, from top wall 26 to the opposite bottom wall is 24.9 cm; if the distance the outlets 34, 34' extend from top wall 26 are included, the overall height of filter housing 20 is 29.52 cm. The weight of filter housing 20 is no greater than 7.58 kg (16.7 lb).

For filter element 50, the length, from frame side wall 58 to the opposite frame side wall 58' is no greater than 71.12 cm and no less than 70.82 cm. The width of filter element 50, from frame back 54 to frame front 56 is no greater than 38.42 cm and no less than 38.13 cm. Pegs 60a, 60b are positioned 28.34 cm±0.038 cm apart on center, and are positioned 0.952±0.038 cm from an edge of side wall 58, 58'. A rubber neoprene gasket 51 is present on the edge of frame 52; it is understood that gasket 51 can be removable and replaceable from filter element 50, and that gasket 51 is not a necessary element of filter element 50. Filtration media 55 is a glass micro-fiber media potted into frame 52 with potting media 59 at a depth of no less than 0.635 cm (0.25 inch). The weight of filter element 50, when clean, is no greater than 2.41 kg (5.3 lb).

Air filter system 10, with filter element 50, is rated at a flow rate of 700 cfm at an efficiency level of 99.97% on 0.3 micron (micrometer) particles. The pressure loss across filter element 50, when clean, is 0.80 inches water (1 mbar) at the rated flow rate of 700 cfm, and the total pressure loss for air filter system 10, when clean, is 1.6 inches water (2 mbar) at the rated flow rate of 700 cfm. At these operating conditions, the estimated life of filter element 50 in an aircraft cabin recirculation system is greater than 5000 hours, which is generally about 12 to 18 months.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts within the principles of the disclosure. For example, any number of pegs 60 can be used. It is not necessary that the number of pegs 60 be the same for each side wall 58, 58' of filter element 50. Further, filter element 50 can be any shape, such as a square, hexagon, circle, or the like. It is not necessary that movable rail 70 extend out from filter housing 20 as in FIGS. 5 and 6; rather, rail 70 may extend from a first position to a second position, the second position being within the interior of filter housing 20. Further, movable rail 70 may not slide in relation to fixed rail 80; rather, for example, movable rail 70 may be incrementally ratcheted. Movable rail 70 is shown in FIGS. 5, 6 and 7 having multiple apertures therethrough, which provide a view of fixed rail 80 and reduce the weight of the air filter system by eliminating material; these apertures can have any shape or size, and may not even be present.

Air filter system 10, and variations thereof, is not limited to use for air planes; rather, system 10 can be used in any application, including boats, automobiles, trains, commercial or residential buildings, or any application that uses an air filter. Further, it is not necessary that the locking system, comprising the movable rail 70, the fixed rail 80, and pegs 60, be used for an air filtration system. Such a locking system may be used in any application where removal and replacement of a part is desired.

The extent of the invention is indicated by the broad general meaning of the terms in which the claims are expressed.

We claim:

1. An air filter system comprising:
   (a) a housing having an inlet and an outlet, the inlet receiving dirty air to an interior of the filter system, and the outlet receiving clean air from the interior, said housing comprising:
      (i) a first rail fixedly attached to the interior of said housing; and
      (ii) a second rail movably attached to said first rail;
   (b) a filter element positioned within said housing, said filter element comprising:
      (i) filtration media;
      (ii) a frame supporting said filtration media; and
      (iii) a peg extending from the frame of said filter element;
   (c) a locking system for retaining said filter element within said housing, said locking system comprising:
      (i) said first rail fixedly attached to the interior of said housing, said first rail having a first retaining feature therein;
      (ii) said second rail movably attached to said first rail, said second rail having a second retaining feature therein;
      (iii) said first retaining feature aligned with said second retaining feature when said second rail is in an extended position, and said first retaining feature offset from said second retaining feature when said second rail is in a retracted position; and
      (iv) said peg constructed and arranged to fit within said first retaining feature and said second retaining feature.

2. The air filter system according to claim 1, wherein said housing has a weight no greater than about 8 kg.

3. The air filter system according to claim 1, wherein said filter element has a weight no greater than about 5 kg.

4. The air filter system according to claim 1, wherein said filter element weighs less than about 3 kg.

5. The air filter system according to claim 1, further comprising:
   (a) a second peg extending from the frame of said filter element;
   (b) a third retaining feature within said first rail;
   (c) a fourth retaining feature within said second rail; said third retaining feature aligned with said fourth retaining feature when said second rail is in the extended positioned, and said third retaining feature offset from said fourth retaining feature when said second rail is in the retracted position; and
   (d) said second peg constructed and arranged to fit within said third retaining feature and said fourth retaining feature.

6. The air filter system according to claim 1, wherein said housing has a volume no greater than about 150,000 cm$^3$.

7. The air filter system according to claim 1, wherein said filter element has a volume no greater than about 100,000 cm$^3$.

8. The air filter system according to claim 1, wherein said first retaining feature comprises a first slot and said second retaining feature comprises a second slot.

9. The air filter system according to claim 5, wherein said first retaining feature comprises a first slot, said second retaining feature comprises a second slot, said third retaining feature comprises a third slot and said fourth retaining feature comprises a fourth slot.

10. The air filter system according to claim 1, wherein said air filter system is installed in an airplane.

11. An air filter system comprising:
   (a) a housing having an inlet, an outlet, and an interior, said housing configured to mount a filter element between said inlet and said outlet;
   (b) a filter element loading and locking mechanism comprising:
      (i) a first guide member on said filter element;
      (ii) a second guide member mounted to said housing and configured to cooperatively engage said first guide member such that said filter element can be slideably inserted into said housing by contact primarily only between said first guide member and said second guide member, said second guide member comprising a first rail fixedly attached to said housing and a second rail movably attached to said first rail;
      (iii) a positioning mechanism in said second rail for cooperatively engaging said first guide member as said filter element is being inserted into said housing for operatively positioning said filter element within said housing; and (iv) a locking mechanism for retainably locking said filter element in said operative position.

12. The air filter system according to claim 11, wherein said filter element has a weight no greater than about 5 kg.

13. The air filter system according to claim 12, wherein said filter element has a weight no greater than about 3 kg.

14. The air filter system according to claim 11, wherein said filter element has a chemical removal portion.

15. The air filter system according to claim 11, wherein said filter element has filtration media comprising glass fibers.

16. The air filter system according to claim 11, wherein said filter element comprises a polygon frame.

17. The air filter system according to claim 16, wherein said frame is a rectangle.

18. The air filter system according to claim 1, wherein said filtration media comprises a chemical removal portion.

19. The air filter system according to claim 1, wherein said filtration media comprises glass fibers.

20. The air filter system according to claim 5, further comprising:

(a) a third peg extending from the frame of said filter element; and (b) a fourth peg extending from the frame of said filter element.

21. The air filter system according to claim 20, wherein:

(a) said first peg is spaced a distance of 28.302 cm to 28.378 cm from said third peg; and (b) said second peg is spaced a distance of 28.302 cm to 28.378 cm from said fourth peg.

* * * * *

UNITED STATES PATENT AND TRADEMARK OFFICE
CERTIFICATE OF CORRECTION

PATENT NO. : 6,585,792 B2
DATED : July 1, 2003
INVENTOR(S) : Schneider et al.

It is certified that error appears in the above-identified patent and that said Letters Patent is hereby corrected as shown below:

Column 2,
Line 28, "looking mechanism" should read -- locking mechanism --

Column 3,
Line 58, "J. D. Lincoln Inc." should read -- J.D. Lincoln Inc. --
Line 59, "or "L901"." should read -- "L-901". --

Column 9,
Line 55, "interior, said" should read -- interior; said --

Signed and Sealed this

Twenty-fifth Day of November, 2003

JAMES E. ROGAN
*Director of the United States Patent and Trademark Office*